UNITED STATES PATENT OFFICE.

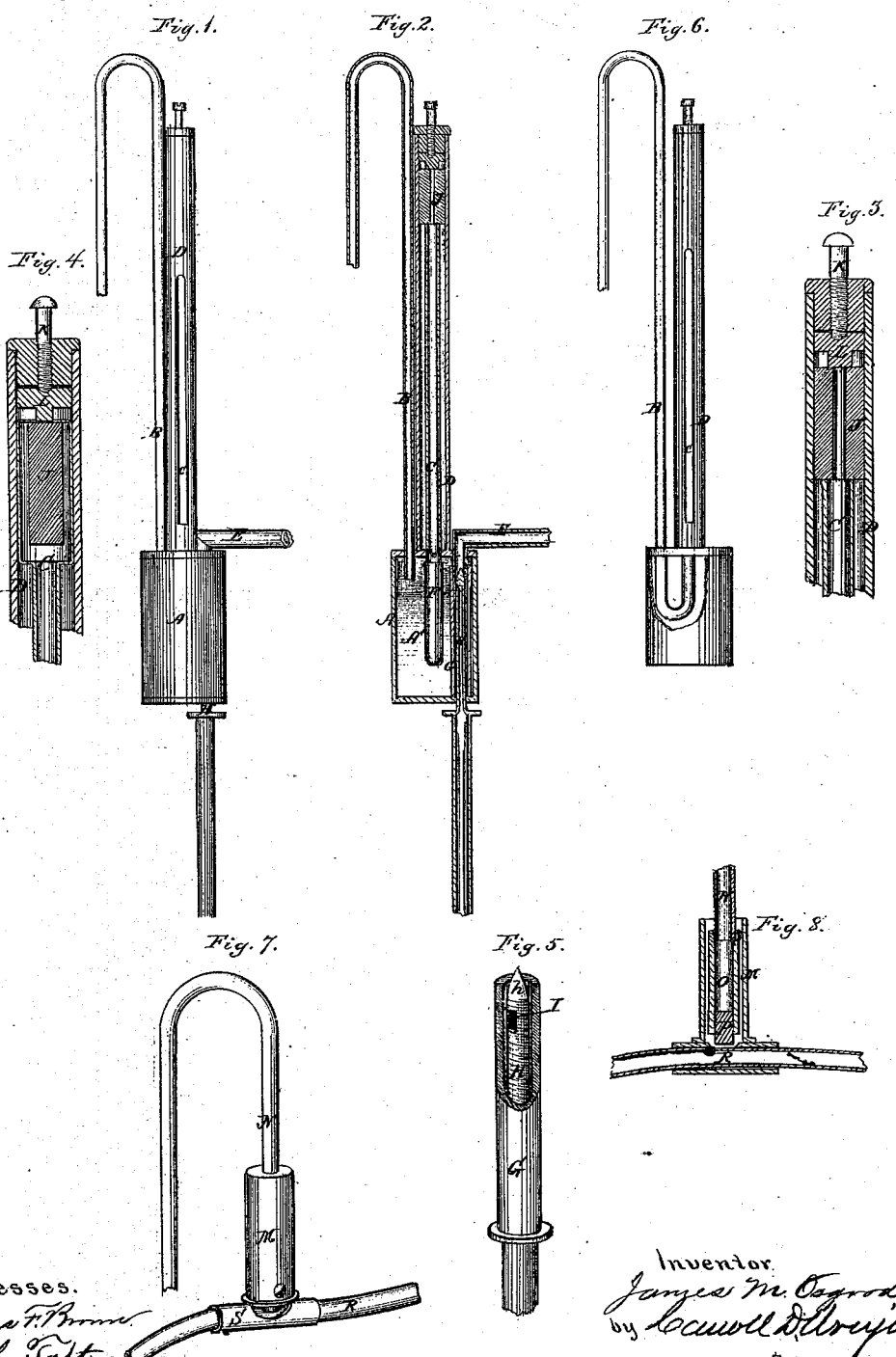

JAMES M. OSGOOD, OF SOMERVILLE, MASSACHUSETTS, ASSIGNOR TO HIMSELF AND FLAGG & OSGOOD, OF SAME PLACE.

IMPROVEMENT IN APPARATUS FOR AUTOMATICALLY REGULATING THE FLOW OF GAS USED IN HEATING VULCANIZERS, &c.

Specification forming part of Letters Patent No. 105,971, dated August 2, 1870.

*To all whom it may concern:*

Be it known that I, JAMES M. OSGOOD, of Somerville, in the county of Middlesex and State of Massachusetts, have invented certain Improvements in Regulator-Gages, of which the following is a specification.

Figure 1 is a side elevation of my invention. Fig. 2 is a transverse vertical central section of the same. Fig. 3 is an enlarged section of a portion of the gage, detached. Fig. 4 is a sectional view of a modification of Fig. 3. Fig. 5 is a perspective view of a portion of the regulator. Figs. 6 and 7 are modifications, and Fig. 8 is a section of Fig. 7.

This invention relates to the vulcanizing of rubber in dentistry, a process involving the use of steam, which is usually generated by the combustion of gas under a suitable boiler; and the object of this invention is to produce efficient and simple devices for regulating the supply of gas and measuring the force of steam generated.

It consists—

First, of a cylindrical vessel filled with water or other suitable fluid and containing a flexible sack filled with mercury, and communicating with a vertical glass tube containing a lighter fluid, and contained in a suitable metal case. The flexible sack depends from the bottom of the glass tube and is acted on by means of the steam through the gage-pipe, which enters the top of the cylindrical vessel and, by its varying pressure on the fluid and flexible sack, causes the mercury and other fluids to rise in the glass tube.

Second, of a cylindrical piece of rubber in the upper end of the case containing the glass tube, closing the end of the latter in such manner that the upward pressure of the fluid, as above described, compresses the rubber in proportion to the degree of steam-pressure on the sack beneath, and indicates said pressure by the rise and fall of the mercury.

Third, of a gas-supplying tube passing through the cylindrical vessel, and consisting of a metal tube, closed at the top, having an orifice in one side, and a cone-shaped end, and a rubber or other flexible sheath surrounding said tube loosely, to admit the passage of gas between itself and the metal tube into a pipe above, said rubber sheath being compressed against the inner tube by the pressure of the water when the force of the steam is too great, and closing the orifice or vent in the side of the tube, thereby checking the flow of gas.

It further consists of certain modifications which, with the details of construction and method of operation, will be more fully described hereinafter.

In the drawings, A represents a cylindrical vessel of metal, through the top of which passes the steam-gage pipe B, the gage-tube C and its casing D, and the gas-pipe E. The vessel A is filled with water or other fluid, A', as shown in Fig. 2.

To the bottom of gage-tube C is attached a flexible sack or bag, F, which extends downward and is surrounded by the water in vessel A. Said bag is filled with mercury and communicates with tube C, which contains some colored or transparent lighter fluid, like alcohol, the tube C being of glass. The gage-pipe B opens into the top of vessel A. The gas-pipe E also enters the top of vessel A, and is fitted to an elastic sheath, G, which extends to the bottom of vessel A.

H represents a smaller gas-tube, provided with a screw-thread, which is screwed through the bottom of vessel A, passing through elastic tube G, and terminating at the end of tube E. The upper end, *h*, of tube H is closed, and of a conical form, as shown in Fig. 5, the passage through the same being effected through the vent or orifice I, the elastic sheath G being sufficiently large to admit of a passage, between itself and tube H, into pipe E. The pressure of steam through gage-pipe B compresses fluid A' in vessel A, which compresses bag F, and causes the mercury and other fluid in tube C to compress the cylindrical rubber J at the upper end of case D, which rubber yields sufficiently to show a variation in the height of the column of mercury, the lighter fluid interposing, which contrasts with the mercury. This latter indicates the pressure to which the column is subjected by means of suitable divisions on tube C.

K represents a set-screw passing through the cap of case B and bearing on a sliding follower, L, which, when the screw is turned downward, compresses rubber J, thus requiring a greater pressure of steam to vary the height of the mercury above described. When the steam-pressure becomes too great, the elastic sheath G is compressed by fluid A', and, pressing closely around the tube H, closes vent I and checks the flow of gas through the same, consequently diminishing the flame and reducing the steam.

This apparatus is extremely simple, compact, accurate, and so sensitive that the least increase of steam-pressure checks the flow of gas, as above described, thus maintaining an even temperature, which is of great importance to the operation of vulcanizing. The gage is also a very cheap and efficient device, and can be readily adjusted to register different degrees of pressure from the most minute to the highest, while the combination of the regulator and gage in one vessel, as shown, makes a very compact device and one of great service in any operation where a regulator-gage is required, the same fluid and pressure serving to regulate the flow of gas and operate the gage.

A modification of the rubber J at the top of case B is shown in Fig. 4, in which the fluid passes around the rubber, pressing it inward instead of outward, as in the former case, while in Fig. 6 the gage-pipe B is connected directly to the tube C, without the intervention of fluid A'.

Figs. 7 and 8 show a modification of the gas-regulating device, in which M represents a cylinder which the gage-pipe N enters, and is fitted to a short flexible tube, O, the lower end of which is stopped by a plug, P. R is a flexible gas-tube, which passes under cylinder M, through casing S. The pressure of steam in pipe N stretches tube O, and causes plug P to compress tube R and regulate the flow of gas. In these several modifications the effects produced are similar to the first-described devices.

I am aware that gages have been used where steam acted against a column of mercury; but I am not aware that a solid column composed of mercury and a lighter liquid above, pressing against a rubber or other elastic cylinder, has been employed to receive the pressure of steam.

Having thus fully described my invention, what I claim as new, and desire to secure by Letters Patent, is—

1. The gage composed of tube C, bag F, casing D, set-screw K, adjustable follower L, and rubber cylinder J, or the modifications of the latter shown in Fig. 4, substantially as described.

2. The combination of the gage, constructed as described, and gage-pipe B and vessel A, as and for the purpose set forth.

3. The gas-pipe E, provided with sheath G, in combination with tube H, having orifice I, substantially as described.

4. The combination of gas-pipe E, provided with sheath G and tube H, and vessel A, containing fluid A', substantially as described.

5. The combination of the gage, constructed as shown, and the gas-pipe E, its sheath G, and tube H, with one vessel, A, so that both gage and regulator will be acted on by the same fluid and pressure, substantially as described.

6. The gas-regulator shown in Figs. 7 and 8, composed of the gage-pipe N, flexible tube O, plug P, and flexible tube R, arranged and operated substantially as described.

7. The regulating of the flow of gas through an elastic pipe by means of steam or fluid-pressure upon said elastic pipe, substantially as set forth.

8. A gage having a solid column composed of mercury, with a lighter liquid above, acting against a rubber or other elastic cylinder, to receive the pressure of steam through the gage-pipe, thus giving a sensitive and efficient gage, substantially as described.

In testimony whereof I have signed my name to this specification in the presence of two subscribing witnesses.

JAMES M. OSGOOD.

Witnesses:
CARROLL D. WRIGHT,
CHARLES F. BROWN.